United States Patent
Sonobe et al.

(10) Patent No.: US 11,462,737 B2
(45) Date of Patent: Oct. 4, 2022

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Kenya Sonobe, Tokyo (JP); Yusuke Adachi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/760,771

(22) PCT Filed: Sep. 23, 2016

(86) PCT No.: PCT/JP2016/004326
§ 371 (c)(1),
(2) Date: Mar. 16, 2018

(87) PCT Pub. No.: WO2017/056467
PCT Pub. Date: Apr. 6, 2017

(65) Prior Publication Data
US 2018/0258202 A1 Sep. 13, 2018

(30) Foreign Application Priority Data
Sep. 30, 2015 (JP) .............................. JP2015-193681

(51) Int. Cl.
*C08F 20/58* (2006.01)
*H01M 4/62* (2006.01)
*H01M 4/139* (2010.01)
*H01M 10/0525* (2010.01)
*H01M 4/13* (2010.01)
*H01M 4/04* (2006.01)

(52) U.S. Cl.
CPC ............. *H01M 4/622* (2013.01); *C08F 20/58* (2013.01); *H01M 4/139* (2013.01); *H01M 10/0525* (2013.01); *H01M 4/0404* (2013.01); *H01M 4/13* (2013.01)

(58) Field of Classification Search
None
See application file for complete search history.

(56) References Cited

U.S. PATENT DOCUMENTS

| 2013/0330622 | A1 | 12/2013 | Sasaki et al. | |
|---|---|---|---|---|
| 2014/0154569 | A1 | 6/2014 | Maeda et al. | |
| 2015/0357647 | A1 | 12/2015 | Kurata et al. | |
| 2016/0118663 | A1* | 4/2016 | Maruhashi | H01M 4/622 429/217 |
| 2016/0126551 | A1* | 5/2016 | Sasaki | H01M 4/622 429/217 |
| 2017/0062828 | A1* | 3/2017 | Sonobe | H01M 4/13 |

FOREIGN PATENT DOCUMENTS

| JP | 2008308548 A | 12/2008 | |
|---|---|---|---|
| JP | 2012204303 A | 10/2012 | |
| JP | 2013131368 A | 7/2013 | |
| JP | 2014222604 A * | 11/2014 | |
| JP | 2015106488 A | 6/2015 | |
| WO | 2012115096 A1 | 8/2012 | |
| WO | 2014112618 A1 | 7/2014 | |
| WO | WO-2014196547 A1 * | 12/2014 | .............. H01M 4/13 |
| WO | 2015033827 A1 | 3/2015 | |
| WO | 2015046191 A1 | 4/2015 | |
| WO | WO-2015186363 A1 * | 12/2015 | ........ H01M 10/0525 |

OTHER PUBLICATIONS

Machine translation of JP 2014-222604 A (Year: 2014).*
Nov. 8, 2016, International Search Report issued in the International Patent Application No. PCT/JP2016/004326.
Apr. 3, 2018, International Preliminary Report on Patentability issued in the International Patent Application No. PCT/JP2016/004326.
May 23, 2019, the Extended European Search Report issued by the European Patent Office in the corresponding European Patent Application No. 16850647.5.
Feb. 1, 2022, Communication pursuant to Article 94(3) EPC issued by the European Patent Office in the corresponding European Patent Application No. 16850647.5.

* cited by examiner

*Primary Examiner* — Robert S Carrico
(74) *Attorney, Agent, or Firm* — Kenja IP Law PC

(57) ABSTRACT

A binder composition for a non-aqueous secondary battery electrode contains a water-soluble polymer including, in a proportion of at least 0.1 mass % and not more than 20 mass %, a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]).

8 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

This disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. Consequently, in recent years, studies have been made to improve electrodes and other battery components with the aim of achieving even higher secondary battery performance.

An electrode for a secondary battery normally includes a current collector and an electrode mixed material layer formed on the current collector. The electrode mixed material layer is formed, for example, by applying, onto the current collector, a slurry composition in which an electrode active material, a binder-containing binder composition, and so forth are dispersed and/or dissolved in a solvent, and then drying the applied slurry composition.

In recent years, there have been attempts to improve binder compositions and slurry compositions used in the formation of electrode mixed material layers in order to further improve secondary battery performance (for example, refer to PTL 1). A binder for a non-aqueous secondary battery described in PTL 1 contains a particulate polymer that includes 0.1 weight % to 5 weight % of an acid group-containing monomer unit, 0.1 weight % to 5 weight % of an amide group-containing monomer unit, and 90 weight % to 99.8 weight % of other monomer units that differ from these monomer units and from (meth)acrylonitrile monomer units.

CITATION LIST

Patent Literature

PTL 1: WO 2015/046191 A1

SUMMARY

Technical Problem

However, the polymer contained in the binder according to PTL 1 cannot sufficiently inhibit electrode swelling associated with repeated charging and discharging, and it has not been possible to sufficiently improve secondary battery high-temperature cycle characteristics with this polymer. Moreover, in a case in which the binder according to PTL 1 is used in formation of a negative electrode of a lithium ion secondary battery, for example, it has not been possible to inhibit deposition of lithium dendrites at the surface of the negative electrode.

Accordingly, one objective of this disclosure is to provide a binder composition for a non-aqueous secondary battery electrode and a slurry composition for a non-aqueous secondary battery electrode that can cause a secondary battery to display good high-temperature cycle characteristics, are capable of forming an electrode mixed material layer that can inhibit deposition of lithium dendrites and the like when used, for example, in formation of a negative electrode of a lithium ion secondary battery, and can favorably inhibit electrode swelling associated with repeated charging and discharging.

Moreover, another objective of this disclosure is to provide an electrode for a non-aqueous secondary battery that causes a secondary battery to display good high-temperature cycle characteristics, can inhibit deposition of lithium dendrites and the like, and does not readily swell even upon repeated charging and discharging.

Yet another objective of this disclosure is to provide a secondary battery that has excellent high-temperature cycle characteristics, and in which deposition of lithium dendrites and the like at an electrode and electrode swelling do not readily occur.

Solution to Problem

The inventors conducted diligent investigation with the aim of solving the problems set forth above. Through this investigation, the inventors made a new discovery that the problems set forth above can be advantageously solved through inclusion, in a binder composition for a non-aqueous secondary battery electrode, of a water-soluble polymer including a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]) in a specific proportion. The inventors completed the present disclosure based on this discovery.

Specifically, this disclosure aims to advantageously solve the problems set forth above by disclosing a binder composition for a non-aqueous secondary battery electrode comprising a water-soluble polymer, wherein the water-soluble polymer includes, in a proportion of at least 0.1 mass % and not more than 20 mass %, a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]). Through use of a binder composition such as set forth above, a secondary battery having good high-temperature cycle characteristics can be obtained, and electrode swelling associated with repeated charging and discharging can be favorably inhibited. Moreover, when a binder composition such as set forth above is used in formation of a negative electrode of a lithium ion secondary battery, for example, it is possible to form an electrode mixed material layer that can inhibit deposition of lithium dendrites and the like.

In the presently disclosed binder composition, the monomer represented by general formula (1) is preferably an N-hydroxyalkyl(meth)acrylamide monomer. As a result of the binder composition containing a water-soluble polymer that includes a monomer unit derived from an N-hydroxyalkyl(meth)acrylamide monomer, secondary battery high-temperature cycle characteristics can be further improved, deposition of lithium dendrites can be further inhibited, and electrode swelling can be further inhibited.

In this disclosure, "(meth)acryl" is used to indicate "acryl" and/or "methacryl".

In the presently disclosed binder composition, the water-soluble polymer preferably further includes an acid group-containing monomer unit in a proportion of at least 5 mass % and not more than 30 mass %. A binder composition containing a water-soluble polymer such as set forth above can improve secondary battery rate characteristics and binding strength of an electrode mixed material layer to a current collector.

In the presently disclosed binder composition, the acid group-containing monomer unit of the water-soluble polymer is preferably at least partially in the form of a monovalent metal salt of an acid group-containing monomer unit. This enables further improvement of high-temperature cycle characteristics of an obtained secondary battery and further inhibition of electrode swelling.

In the presently disclosed binder composition, the water-soluble polymer preferably further includes a (meth)acrylamide monomer unit in a proportion of at least 40 mass % and not more than 94.9 mass %. A binder composition containing a water-soluble polymer such as set forth above can further inhibit electrode swelling and further improve secondary battery high-temperature cycle characteristics.

In the presently disclosed binder composition, the water-soluble polymer preferably has a degree of swelling in electrolysis solution of a factor of 1.50 or less. A binder composition such as set forth above can further improve secondary battery cycle characteristics and further inhibit electrode swelling.

Note that the "degree of swelling in electrolysis solution" of a water-soluble polymer can be measured by a method described in the EXAMPLES section.

In the presently disclosed binder composition, the monomer represented by general formula (1) is preferably N-hydroxyethylacrylamide. Through use of a binder composition for which the monomer represented by general formula (1) is N-hydroxyethylacrylamide, electrode swelling can be further inhibited.

Moreover, this disclosure aims to advantageously solve the problems set forth above by disclosing a slurry composition for a non-aqueous secondary battery electrode comprising an electrode active material, water, and any of the foregoing binder compositions for a non-aqueous secondary battery electrode. Through use of a slurry composition such as set forth above, a secondary battery having good high-temperature cycle characteristics can be obtained, and electrode swelling associated with repeated charging and discharging can be favorably inhibited. Moreover, when a slurry composition such as set forth above is used in formation of a negative electrode of a lithium ion secondary battery, for example, it is possible to form an electrode mixed material layer that can inhibit deposition of lithium dendrites and the like.

Furthermore, this disclosure aims to advantageously solve the problems set forth above by disclosing an electrode for a non-aqueous secondary battery comprising an electrode mixed material layer formed using the foregoing slurry composition for a non-aqueous secondary battery electrode. Through use of an electrode for a non-aqueous secondary battery such as set forth above, a secondary battery can be caused to display good high-temperature cycle characteristics, and deposition of lithium dendrites and the like and be inhibited. Moreover, an electrode such as set forth above does not readily swell even upon repeated charging and discharging.

Also, this disclosure aims to advantageously solve the problems set forth above by disclosing a non-aqueous secondary battery comprising the foregoing electrode. A non-aqueous secondary battery such as set forth above has excellent high-temperature cycle characteristics and tends not to experience deposition of lithium dendrites and the like at an electrode or electrode swelling Advantageous Effect According to this disclosure, it is possible to provide a binder composition for a non-aqueous secondary battery electrode and a slurry composition for a non-aqueous secondary battery electrode that can cause a secondary battery to display good high-temperature cycle characteristics, are capable of forming an electrode mixed material layer that can inhibit deposition of lithium dendrites and the like when used, for example, in formation of a negative electrode of a lithium ion secondary battery, and can favorably inhibit electrode swelling associated with repeated charging and discharging.

Moreover, according to this disclosure, it is possible to provide an electrode for a non-aqueous secondary battery that causes a secondary battery to display good high-temperature cycle characteristics, can inhibit deposition of lithium dendrites and the like, and does not readily swell even upon repeated charging and discharging.

Furthermore, according to this disclosure, it is possible to provide a non-aqueous secondary battery that has excellent high-temperature cycle characteristics, and in which deposition of lithium dendrites and the like at an electrode and electrode swelling do not readily occur.

DETAILED DESCRIPTION

The following provides a detailed description of embodiments of the present disclosure.

The presently disclosed binder composition for a non-aqueous secondary battery electrode is used, for example, in formation of an electrode of a non-aqueous secondary battery such as a lithium ion secondary battery.

Moreover, the presently disclosed slurry composition for a non-aqueous secondary battery electrode contains this binder composition and is used in production of the presently disclosed electrode for a non-aqueous secondary battery.

Furthermore, the presently disclosed electrode for a non-aqueous secondary battery includes an electrode mixed material layer formed using the presently disclosed slurry composition for a non-aqueous secondary battery electrode, and is used in the presently disclosed non-aqueous secondary battery.

Binder Composition For Non-Aqueous Secondary Battery Electrode

The presently disclosed binder composition for a non-aqueous secondary battery electrode contains a water-soluble polymer. The water-soluble polymer includes a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]) in a proportion of at least 0.1 mass % and not more than 20 mass %.

<Water-Soluble Polymer>

The water-soluble polymer in this disclosure, which has a make-up described below, is a component that can improve battery characteristics of a secondary battery by coating the surface of an electrode active material. The water-soluble polymer is required to include a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]) in a proportion of at least 0.1 mass % and not more than 20 mass %, when all repeating units included in the water-soluble polymer are taken to be 100 mass %. Moreover, it is preferable that the monomer represented by general formula (1) is an N-hydroxyalkyl(meth)acrylamide monomer. The water-soluble polymer preferably includes an acid group-containing monomer unit in a proportion of at least 5 mass % and not more than 30 mass %. Moreover, the water-soluble polymer preferably includes a (meth)acrylamide monomer unit in a proportion of at least 40 mass % and not more than 94.9 mass %.

Conventionally, secondary batteries suffer from a problem that during repeated use, high-temperature cycle characteristics and other electrical characteristics of the secondary battery deteriorate due to side reactions between electrolysis solution components and an electrode active material contained in an electrode. As a result of diligent studies conducted with the aim of solving this problem, the inventors discovered that when an electrode mixed material layer is formed using a binder composition that contains a water-soluble polymer including a monomer unit derived from a monomer represented by general formula (1) in a specific proportion, the water-soluble polymer can thinly and extensively coat the surface of an electrode active material in the electrode mixed material layer. This coating reduces the area of the electrode active material surface that is exposed to electrolysis solution, and thereby inhibits side reactions between the electrode active material and electrolysis solution components. As a result, the electrical characteristics of a secondary battery including this electrode mixed material layer can be remarkably improved, and deposition of lithium dendrites and the like can be inhibited. By inhibiting lithium dendrite deposition, it is possible to further improve secondary battery safety by reducing the risk of a short-circuit occurring in the secondary battery due to damage to a separator caused by lithium dendrites. Moreover, by reducing the area of the electrode active material surface that is exposed to electrolysis solution, electrode swelling associated with repeated charging and discharging can be inhibited, and secondary battery high-temperature cycle characteristics can be improved.

[Monomer Unit Derived from Monomer Represented by General Formula (1)]

[Monomer unit derived from monomer represented by general formula (1)]

A monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]) is included as a monomer unit in the water-soluble polymer according to this disclosure. The alkyl group of $R^1$ in general formula (1) preferably has a carbon number of 2 or less. Moreover, from a viewpoint of thinly and extensively coating the surface of an electrode active material to further improve secondary battery high-temperature cycle characteristics, further inhibiting deposition of lithium dendrites, and further inhibiting electrode swelling, it is preferable that le in general formula (1) is hydrogen or a methyl group, and it is preferable that 1=0 for $R^2$ (i.e., that $R^2$ is an alkylene group $(CHR^3)_n$). In other words, the monomer represented by general formula (1) is preferably an N-hydroxyalkyl (meth)acrylamide monomer. Moreover, the carbon number n of the alkylene group $(CHR^3)_n$ of $R^2$ is preferably 10 or less, more preferably 5 or less, and even more preferably 3 or less. More specifically, preferable examples of the monomer represented by general formula (1) include N-hydroxymethyl(meth)acrylamide, N-hydroxyethyl(meth)acrylamide, N-hydroxypropyl(meth)acrylamide, N-(5-hydroxypentyl) (meth)acrylamide, N-(2-hydroxy-1,1-dimethylethyl)(meth) acrylamide, N-(2-hydroxypropyl) (meth)acrylamide, N-(1-ethyl-2-hydroxyethyl)(meth)acrylamide, N-(2-(2-hydroxyethoxy) ethyl)(meth)acrylamide, N-(1-(hydroxymethyl) ethyl)(meth)acrylamide, N-(1- hydroxy-4-methylpentan-2-yl)(meth)acrylamide, and N-(1-hydroxy-3-methylbutan-2-yl) (meth)acrylamide. Of these N-hydroxyalkyl(meth) acrylamide monomers, N-hydroxymethyl(meth)acrylamide and N-hydroxyethyl(meth)acrylamide are preferable, and N-hydroxyethylacrylamide is particularly preferable. In a case in which N-hydroxyethylacrylamide is used as the monomer represented by general formula (1) for the water-soluble polymer, the use of a binder composition containing this water-soluble polymer enables further inhibition of electrode swelling and further improvement of electrode peel strength.

One monomer represented by general formula (1) may be used individually, or two or more monomers represented by general formula (1) may be used in combination.

The percentage content of the monomer unit derived from the monomer represented by general formula (1) in the water-soluble polymer when all repeating units in the water-soluble polymer are taken to be 100 mass % is required to be at least 0.1 mass % and not more than 20 mass %, is preferably 0.5 mass % or more, and more preferably 1 mass % or more, and is preferably 15 mass % or less. By setting the percentage content of the monomer unit derived from the monomer represented by general formula (1) within any of the ranges set forth above, it is possible to provide a binder composition for a non-aqueous secondary battery electrode that can cause a secondary battery to display good high-temperature cycle characteristics, is capable of forming an electrode mixed material layer that can inhibit deposition of lithium dendrites and the like when used, for example, in formation of a negative electrode of a lithium ion secondary battery, and can favorably inhibit electrode swelling associated with repeated charging and discharging.

[Acid Group-Containing Monomer Unit]

The water-soluble polymer preferably further includes an acid group-containing monomer unit. Examples of acid group-containing monomers that can be used to form the acid group-containing monomer unit include carboxylic acid group-containing monomers, sulfonate group-containing monomers, phosphate group-containing monomers, and hydroxy group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid. In the present specification, "(meth)allyl" is used to indicate "allyl" and/or "methallyl", and "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate. In the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Of these acid group-containing monomers, a carboxylic acid group-containing monomer such as acrylic acid, methacrylic acid, or itaconic acid is preferable, a monocarboxylic acid is more preferable from a viewpoint of improving polymerizability of the water-soluble polymer, increasing mechanical strength of the water-soluble polymer, and inhibiting electrode swelling, and acrylic acid or methacrylic acid is even more preferable.

One acid group-containing monomer may be used individually, or two or more acid group-containing monomers may be used in combination.

The percentage content of the acid group-containing monomer unit in the water-soluble polymer when all repeating units in the water-soluble polymer are taken to be 100 mass % is preferably 5 mass % or more, more preferably 10 mass % or more, and even more preferably 15 mass % or more, and is preferably 30 mass % or less, and more preferably 25 mass % or less. When the percentage content of the acid group-containing monomer unit in the water-soluble polymer is at least any of the lower limits set forth above, aggregation in a slurry composition of an electrode active material onto which the water-soluble polymer is adsorbed can be inhibited, secondary battery rate characteristics can be improved, binding strength of an electrode mixed material layer to a current collector can be improved, and electrode peel strength can be improved. Moreover, when the percentage content of the acid group-containing monomer unit in the water-soluble polymer is not more than any of the upper limits set forth above, residual water content in an electrode can be reduced, and secondary battery high-temperature cycle characteristics can be further improved. Moreover, in a situation in which the water-soluble polymer is used in combination with a binder that is a styrene-butadiene latex or the like in production of a slurry composition for an electrode containing the binder composition that contains this water-soluble polymer, coagulation of the latex and thickening can be inhibited, and a slurry composition having excellent producibility can be obtained.

It is preferable that the acid group-containing monomer unit is at least partially in a neutralized state forming a salt with a metal. Examples of the metal include, but are not specifically limited to, monovalent metals such as lithium, sodium, and potassium, and divalent metals such as magnesium, calcium, and strontium. A monovalent metal is preferable. In other words, it is preferable that the acid group-containing monomer unit forming the water-soluble polymer is at least partially in the form of a monovalent metal salt of an acid group-containing monomer unit. This enables improvement of coverage of an electrode active material by the water-soluble polymer and improvement of coatability of a slurry composition for a non-aqueous secondary battery electrode in which the binder composition containing the water-soluble polymer is used.

Moreover, it is preferable that the acid group-containing monomer unit is a carboxylic acid group-containing monomer unit and that this carboxylic acid group-containing monomer unit forms a salt with a metal. From a viewpoint of further improving electrode active material coverage and slurry composition coatability described above, it is preferable that the carboxylic acid group of the carboxylic acid group-containing monomer unit forms a metal salt with a monovalent metal such as lithium, sodium, or potassium. Moreover, from a viewpoint of inhibiting deposition of lithium dendrites in a case in which the water-soluble polymer is used in formation of a negative electrode of a lithium ion secondary battery, for example, it is preferable that the carboxylic acid group forms a metal salt with lithium.

No specific limitations are placed on the method by which the acid group of the acid group-containing monomer unit is placed in a neutralized state. For example, a monomer that has been neutralized in advance using a metal hydroxide such as sodium hydroxide or lithium hydroxide may be polymerized as an acid group-containing monomer used to obtain the water-soluble polymer, or the acid group of an acid group-containing monomer unit in the water-soluble polymer may be neutralized by adding and mixing an aqueous solution of a metal hydroxide such as sodium hydroxide or lithium hydroxide after the water-soluble polymer has been obtained.

The percentage neutralization of acid groups (i.e., the ratio of neutralized acid groups relative to acid groups prior to neutralization) is not specifically limited. However, from a viewpoint of improving coverage of an electrode active material by the water-soluble polymer and improving coatability of a slurry composition for a non-aqueous secondary battery electrode, the percentage neutralization of acid groups is preferably 10 mol % or more, more preferably 30 mol % or more, and even more preferably 50 mol % or more, and is preferably 100 mol % or less, more preferably 95 mol % or less, and even more preferably 90 mol % or less. The percentage neutralization of acid groups can be adjusted, for example, through the molar ratio of the additive amount of the metal hydroxide relative to the amount of the acid group-containing monomer.

[(Meth)Acrylamide Monomer Unit]

The water-soluble polymer preferably further includes a (meth)acrylamide monomer unit. (Meth)acrylamide monomers that can be used to form the (meth)acrylamide monomer unit are those other than methacrylamide monomers represented by general formula (1), and specific examples thereof include acrylamide, methacrylamide, dimethylacrylamide, and dimethylmethacrylamide. Unsubstituted acrylamide and methacrylamide are preferable, and acrylamide is more preferable. One of these (meth)acrylamide monomers may be used individually, or two or more of these (meth)acrylamide monomers may be used in combination in a freely selected ratio.

The percentage content of the (meth)acrylamide monomer unit in the water-soluble polymer when all repeating units in the water-soluble polymer are taken to be 100 mass % is preferably 40 mass % or more, more preferably 50 mass % or more, even more preferably 55 mass % or more, and particularly preferably 70 mass % or more, and is preferably 94.9 mass % or less, and more preferably 90 mass % or less. When the percentage content of the (meth)acrylamide monomer unit is at least any of the lower limits set forth above, the water-soluble polymer can be provided with appropriate cohesive force, electrode swelling can be further inhibited, and, as a result, secondary battery high-temperature cycle characteristics can be further improved. Moreover, when the percentage content of the (meth)acrylamide monomer unit is not more than any of the upper limits set forth above, electrode heat resistance can be improved, and secondary battery high-temperature cycle characteristics can be further improved.

[Other Monomer Units Optionally Forming Water-Soluble Polymer]

The water-soluble polymer may include other monomer units besides the various monomer units described above. Examples of other monomer units include, but are not specifically limited to, known monomer units that can be included in water-soluble polymers such as a crosslinkable monomer unit and a (meth)acrylic acid ester monomer unit.

<Degree of Swelling in Electrolysis Solution of Water-Soluble Polymer>

In this disclosure, the "degree of swelling in electrolysis solution" of the water-soluble polymer can be determined as a value (factor) obtained by dividing the weight of a film formed from the water-soluble polymer after this film has been immersed in a specific electrolysis solution under specific conditions by the weight of this film before immersion. Specifically, a film is formed by a method described in the EXAMPLES section of the present specification, and then measurement is performed by a method also described in the EXAMPLES section.

The degree of swelling in electrolysis solution of the water-soluble polymer is preferably a factor of more than 1.00, and more preferably a factor of 1.05 or more, and is preferably a factor of 1.50 or less, more preferably a factor of 1.40 or less, and even more preferably a factor of 1.30 or less. When the degree of swelling in electrolysis solution of the water-soluble polymer is more than the lower limit set forth above, mobility of electrode active material ions in a secondary battery can be improved, secondary battery internal resistance can be reduced, and secondary battery rate characteristics can be further improved. Moreover, when the degree of swelling in electrolysis solution of the water-soluble polymer is not more than any of the upper limits set forth above, reduction in the binding strength of an electrode mixed material layer to a current collector in electrolysis solution can be inhibited, electrode swelling can be further inhibited, and secondary battery cycle characteristics can be further improved.

The degree of swelling in electrolysis solution of the water-soluble polymer can be adjusted by altering the types and amounts of used monomers. Moreover, the degree of swelling in electrolysis solution can be reduced by adjusting polymerization conditions such as the amount of catalyst and the temperature in polymerization to increase the molecular weight of the water-soluble polymer, or by reducing the amount of residual monomer, oligomer, or the like.

<Viscosity of Water-Soluble Polymer>

In this disclosure, the viscosity of a dilute solution of the water-soluble polymer having a solid content of 1% is preferably 10 mPa·s or more, more preferably 30 mPa·s or more, and even more preferably 50 mPa·s or more, and is preferably 5,000 mPa·s or less, more preferably 3,000 mPa·s or less, and even more preferably 1,000 mPa·s or less. When the viscosity of the water-soluble polymer is within any of the ranges set forth above, coverage of the surface of an electrode active material can be further improved, and coatability of a slurry composition containing the water-soluble polymer can be sufficiently improved.

In this disclosure, "viscosity of the water-soluble polymer" refers to the viscosity at a rotation speed of 60 rpm measured with respect to a dilute solution of the water-soluble polymer having a solid content of 1% at 25° C. using a B-type viscometer. The viscosity of the water-soluble polymer can be adjusted through adjustment of the molecular weight of the water-soluble polymer, for example.

<pH of Water-Soluble Polymer>

Although no specific limitations are placed on the pH of the binder composition for a non-aqueous secondary battery containing the water-soluble polymer in this disclosure, the pH of a dilute solution of the water-soluble polymer having a solid content of 1%, for example, is preferably 3.0 or higher, more preferably 6.0 or higher, even more preferably 7.0 or higher, and most preferably 7.5 or higher. When this pH is within any of the ranges set forth above, dispersibility of an electrode active material can be improved when a slurry composition for a non-aqueous secondary battery electrode is produced, and thus a composition having excellent coatability can be obtained. For the same reason, the pH of a dilute solution of the water-soluble polymer having a solid content of 1% is preferably 12.0 or lower, more preferably 11.0 or lower, even more preferably 10.0 or lower, and most preferably 9.0 or lower.

Although no specific limitations are placed on the method by which the pH of the water-soluble polymer is adjusted, the pH can be adjusted, for example, by performing polymerization to obtain the water-soluble polymer after mixing a basic substance such as sodium hydroxide or lithium hydroxide in advance, or by performing pH adjustment through addition and mixing of a basic substance after polymerization.

<Production Method of Water-Soluble Polymer>

The water-soluble polymer set forth above can be produced, for example, by any of solution polymerization, suspension polymerization, bulk polymerization, emulsion polymerization, or the like without any specific limitations. Moreover, the polymerization method may be addition polymerization such as ionic polymerization, radical polymerization, or living radical polymerization. A known polymerization initiator may be used as a polymerization initiator. Of such polymerization methods, radical polymerization using a redox polymerization initiator that includes an iron-based compound is preferable. The redox polymerization initiator is not specifically limited and may, for example, be a typical combination of an oxidizing agent and a reducing agent. A solution that is obtained through the polymerization reaction and that contains the water-soluble polymer and polymerization solvent may be used as-produced to prepare a slurry composition, particularly when the polymerization solvent is water, or may be used to prepare a slurry composition after undergoing solvent substitution, addition of optional components, or the like. Other additives that can be used in polymerization (for example, emulsifiers, dispersants, polymerization aids, chain transfer agents, and molecular weight modifiers) may be the same as typically used, and the amounts of these other additives may also be the same as typically used.

<Other Components>

In addition to the water-soluble polymer, the presently disclosed binder composition may contain components such as a conductive additive, a reinforcing material, a leveling agent, a viscosity modifier, an additive for electrolysis solution, a preservative, a fungicide, a defoamer, a polymerization inhibitor, and a polymer other than the water-soluble polymer. These other components are not specifically limited so long as they do not affect the battery reactions and may be selected from commonly known components such as those described in WO 2012/115096 A1.

In particular, a water-insoluble particulate polymer may be contained as a polymer other than the water-soluble polymer. The particulate polymer is a component that is dispersed in a binder composition or slurry composition while maintaining a particulate form. Moreover, when an electrode is formed, the particulate polymer is a component that functions as a binder for holding components (for example, an electrode active material) contained in an electrode mixed material layer of the produced electrode such that these components do not detach from the electrode. Note that in an electrode mixed material layer formed using a slurry composition, the particulate polymer may be present in a particulate form, or may be present in any other form.

Examples of particulate polymers that may be used include, but are not specifically limited to, a styrene-butadiene copolymer, an acrylic polymer, and a fluorine-containing polymer. Moreover, the particulate binder may be a polymer that is formed from a single polymer or may be a polymer having a core-shell structure that is formed from two or more types of polymers. One of these particulate polymers may be used individually, or two or more of these particulate polymers may be used in combination in a freely selected ratio.

A viscosity modifier is a component that can increase the viscosity of the binder composition for a non-aqueous secondary battery electrode and can inhibit sedimentation of components in the binder composition, while also ensuring coatability of the binder composition. A water-soluble polymer other than the water-soluble polymer set forth above may be used as a viscosity modifier. Examples of other water-soluble polymers that can function as a viscosity modifier include, but are not specifically limited to, carboxymethyl cellulose, methyl cellulose, hydroxypropyl methylcellulose, hydroxyethyl methyl cellulose, polyvinyl alcohol, polycarboxylic acids, and salts thereof, polyvinylpyrrolidone, xanthan gum, polyethers, and water-soluble terpenes. Examples of polycarboxylic acids include polyacrylic acid, polymethacrylic acid, and alginic acid. One of these examples may be used individually, or two or more of these examples may be used in combination in a freely selected ratio.

<Production of Binder Composition>

The presently disclosed binder composition can be produced by dispersing the components described above in an aqueous medium that serves as a dispersion medium. Specifically, the binder composition can be produced by mixing the above-described components and the aqueous medium using a mixer such as a ball mill, a sand mill, a bead mill, a pigment disperser, a grinding machine, an ultrasonic disperser, a homogenizer, a planetary mixer, or a FILMIX.

In a situation in which the water-soluble polymer is produced by polymerizing a monomer composition in an aqueous solvent, the water-soluble polymer can be mixed with the other components as-produced in the form of a water dispersion. Moreover, in a situation in which the water-soluble polymer is mixed in the form of a water dispersion, water in the water dispersion may be used as the aforementioned aqueous medium.

(Slurry Composition for Non-Aqueous Secondary Battery Electrode)

The presently disclosed slurry composition for a non-aqueous secondary battery electrode contains the binder composition set forth above, an electrode active material, and water. The slurry composition for a non-aqueous secondary battery electrode can cause a secondary battery to display good high-temperature cycle characteristics, is capable of forming an electrode mixed material layer that can inhibit deposition of lithium dendrites and the like when used, for example, in formation of a negative electrode of a lithium ion secondary battery, and can favorably inhibit electrode swelling associated with repeated charging and discharging.

<Electrode Active Material>

The electrode active material is a material that accepts and donates electrons in an electrode (positive/negative electrode) of a secondary battery. The following describes the electrode active material (positive/negative electrode active material) contained in the slurry composition using one example in which the slurry composition for a non-aqueous secondary battery electrode is a slurry composition for a lithium ion secondary battery electrode that is used in production of an electrode of a lithium ion secondary battery.

[Positive Electrode Active Material]

Known positive electrode active materials that are used in positive electrodes of lithium ion secondary batteries may be used herein as a positive electrode active material without any specific limitations. Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide of lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn, lithium-containing composite oxide of Ni—Mn—Al, lithium-containing composite oxide of Ni—Co—Al, and a solid solution comprising $LiMaO_2$ and $Li_2MbO_3$. Examples of the solid solution comprising $LiMaO_2$ and $Li_2MbO_3$ include $xLiMaO_2 \cdot (1-x)Li_2MbO_3$ and the like, where x represents a number satisfying 0<x<1, Ma represents one or more types of transition metals having an average oxidation state of 3+, and Mb represents one or more types of transition metals having an average oxidation state of 4+.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, where Mc represents one or more types of transition metals having an average oxidation state of 4+, specific examples of which include Ni, Co, Fe, Cu, and Cr; t represents a number satisfying $0<t<1$; and s represents a number satisfying $0 \le s \le 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by $Li_yMdPO_4$, such as olivine-type lithium iron phosphate ($LiFePO_4$) and olivine-type lithium manganese phosphate ($LiMnPO_4$), where Md represents one or more types of transition metals having an average oxidation state of 3+, examples of which include Mn, Fe, and Co, and y represents a number satisfying $0 \le y \le 2$. Md of the olivine-type lithium phosphate compounds represented by $Li_yMdPO_4$ may be partly substituted with another metal. Examples of metals that may substitute part of Md include Cu, Mg, Zn, V, Ca, Sr, Ba, Ti, Al, Si, B, and Mo.

Of these examples, it is preferable to use lithium-containing cobalt oxide ($LiCoO_2$) or olivine-type lithium iron phosphate ($LiFePO_4$) as the positive electrode active material from a viewpoint of improving the high-temperature cycle characteristics and initial capacity of a secondary battery including a positive electrode formed using the slurry composition.

On the other hand, to increase the capacity of the lithium ion secondary battery that includes the positive electrode formed with the slurry composition, a positive electrode active material containing at least one of Mn and Ni is preferred. Specifically, from a viewpoint of increasing the capacity of the lithium ion secondary battery, $LiNiO_2$, $LiMn_2O_4$, a lithium-rich spinel compound, $LiMnPO_4$, $Li[Ni_{0.5}\ Co_{0.2}Mn_{0.3}]O_2$, $Li[Ni_{1/3}\ Co_{1/3}Mn_{1/3}]O_2$, $Li[Ni_{0.17}L_{i0.2}\ Co_{0.07}Mn_{0.56}]O_2$, $LiNi_{0.5}Mn_{1.5}O_4$, or the like is preferably used as the positive electrode active material, $LiNiO_2$, a lithium-rich spinel compound, $Li[Ni_{0.5}Co_{0.2}Mn_{0.3}]O_2$, $Li[Ni_{1/3}\ Co_{1/3}Mn_{1/3}]O_2$, $Li[Ni_{0.17}Li_{0.2}Co_{0.07}Mn_{0.56}]O_2$, or the like is more preferably used as the positive electrode active material, and $Li[Ni_{0.5}\ Co_{0.2}Mn_{0.3}]O_2$ is particularly preferably used as the positive electrode active material.

The particle diameter of the positive electrode active material is not specifically limited and may be the same as that of a conventionally used positive electrode active material.

[Negative Electrode Active Material]

Known negative electrode active materials that are used in negative electrodes of lithium ion secondary batteries may be used herein as a negative electrode active material without any specific limitations. Specifically, the negative electrode active material is normally a material that can occlude and release lithium. Examples of materials that can occlude and release lithium include a carbon-based negative electrode active material, a metal-based negative electrode active material, and a negative electrode active material that is a combination thereof.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of the carbonaceous material include graphitizing carbon whose carbon structure can easily be changed according to the heat treatment temperature, and non-graphitizing carbon typified by glassy carbon, which has a structure similar to an amorphous structure.

The graphitizing carbon may be a carbon material made using tar pitch obtained from petroleum or coal as a raw material. Specific examples of the graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of the graphitic material include graphite such as natural graphite and artificial graphite.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The silicon-containing alloy may be, for example, an alloy composition that contains silicon, aluminum, and transition metals such as iron, and further contains rare-earth elements such as tin and yttrium.

$SiO_x$ is a compound including Si and at least one of SiO and $SiO_2$, where x is normally at least 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has been pulverized and mixed with the optional polymer, the heat treatment can be performed at a temperature of 900° C. or higher, and preferably 1000° C. or higher, in an atmosphere containing organic gas and/or vapor.

The composite of a Si-containing material and conductive carbon may be a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the aforementioned composite, such as a method of coating the surfaces of particles of SiO with organic gas or the like by chemical vapor deposition, or a method of forming composite particles by a mechanochemical process (granulation) using SiO particles and graphite or artificial graphite.

<Binder Composition>

The binder composition contained in the slurry composition for a non-aqueous secondary battery electrode can be the presently disclosed binder composition for a non-aqueous secondary battery electrode containing the previously described water-soluble polymer. The previously described water-soluble polymer contained in the binder composition set forth above functions as at least part of a binder in an electrode mixed material layer formed using the slurry composition for a non-aqueous secondary battery electrode. The amount of the binder composition in the slurry composition for a non-aqueous secondary battery electrode is preferably adjusted such that the compounding ratio of the water-soluble polymer is within a range described below when total solid content of the slurry is taken to be 100 mass %.

[Amount of Water-Soluble Polymer]

The amount of the binder composition in the slurry composition for a non-aqueous secondary battery electrode is set such that the amount of the water-soluble polymer when total solid content in the slurry composition is taken to be 100 mass % is preferably 0.01 mass % or more, more preferably 0.05 mass % or more, and even more preferably 0.1 mass % or more, and is preferably 5.0 mass % or less, more preferably 4.0 mass % or less, and even more preferably 3.0 mass % or less. When the amount of the water-soluble polymer is at least any of the lower limits set forth above, deposition of lithium dendrites and the like can be inhibited in a case in which the slurry composition is used to form a negative electrode of a lithium ion secondary battery, for example, and secondary battery high-temperature cycle characteristics and rate characteristics can be further improved. Moreover, when the amount of the water-soluble polymer is not more than any of the upper limits set forth above, secondary battery rate characteristics can be further improved.

<Conductive Additive>

The conductive additive ensures electrical contact amongst the electrode active material. The conductive additive may be a known conductive additive without any specific limitations. Specific examples of conductive additives that can be used in a positive electrode of a lithium ion secondary battery, for example, include conductive carbon materials such as acetylene black, Ketjen Black® (Ketjen black is a registered trademark in Japan, other countries, or both), carbon black, graphite, and carbon nanotubes (single-walled or multi-walled); and fibers and foils of various metals.

<Other Polymers>

The presently disclosed slurry composition for a secondary battery electrode may optionally contain a particulate polymer and/or a viscosity modifier such as previously described.

[Amount of Particulate Polymer]

In a case in which the slurry composition for a non-aqueous secondary battery electrode contains a particulate polymer, the amount of the particulate polymer when total solid content in the slurry composition is taken to be 100 mass % is preferably 0.1 mass % or more, more preferably 0.5 mass % or more, and even more preferably 1 mass % or more, and is preferably 5 mass % or less, more preferably 4 mass % or less, even more preferably 3 mass % or less, and particularly preferably 2 mass % or less. When the compounding ratio of the particulate polymer is within any of the ranges set forth above, electrode peel strength and secondary battery rate characteristics can be further improved.

[Amount of Viscosity Modifier]

In a case in which the slurry composition for a non-aqueous secondary battery electrode contains another water-soluble polymer as a viscosity modifier, the content of this other water-soluble polymer is preferably 90 mass % or less when the total content of this other water-soluble polymer and the water-soluble polymer having the previously described make-up is taken to be 100 mass %. When the compounding ratio of the other water-soluble polymer is 90 mass % or less, thin and extensive coating of the surface of the electrode active material by the water-soluble polymer is not impeded. As a result, thixotropy of the slurry composition can be improved, intermittent application using the slurry composition is possible, and coatability of the slurry composition is improved.

<Other Additives>

Examples of other components besides those described above that may be contained in the presently disclosed slurry composition for a secondary battery electrode include, but are not specifically limited to, the same other components that may be contained in the presently disclosed binder composition. One of such other components may be used individually, or two or more of such other components may be used in combination in a freely selected ratio.

<Production of Slurry Composition for Non-Aqueous Secondary Battery Electrode>

The presently disclosed slurry composition for a non-aqueous secondary battery electrode can be produced by dispersing the components described above in an aqueous medium that serves as a dispersion medium. Specifically, the slurry composition can be produced by mixing the above-described components and the aqueous medium using a mixer such as a ball mill, a sand mill, a bead mill, a pigment disperser, a grinding machine, an ultrasonic disperser, a homogenizer, a planetary mixer, or a FILMIX. Mixing of the above-described components and the aqueous medium may normally be performed for a period of from 10 minutes to several hours in a temperature range of from room temperature to 80° C.

Although water is normally used as the aqueous medium, alternatively, an aqueous solution of a freely selected compound or a mixed solution of a small amount of an organic medium and water may be used. Note that water used as the aqueous medium may include water that was contained in the binder composition.

<Viscosity of Slurry Composition for Non-Aqueous Secondary Battery Electrode>

The viscosity of the presently disclosed slurry composition for a non-aqueous secondary battery electrode is preferably 1,000 mPa·s or more, more preferably 1,500 mPa·s or more, and even more preferably 2,000 mPa·s or more, and is preferably 8,000 mPa·s or less, more preferably 6,000 mPa·s or less, and even more preferably 4,000 mPa·s or less. When the viscosity of the slurry composition is within any of the ranges set forth above, coatability of the slurry composition can be sufficiently improved.

In this disclosure, "viscosity of the slurry composition for a non-aqueous secondary battery electrode" refers to the viscosity at a rotation speed of 60 rpm measured at a temperature of 25° C. using a B-type viscometer. The viscosity of the slurry composition for a non-aqueous secondary battery electrode can be adjusted by altering the viscosity of the water-soluble polymer and the content of each component in the slurry composition for a non-aqueous secondary battery electrode.

(Electrode for Non-Aqueous Secondary Battery)

The presently disclosed electrode for a non-aqueous secondary battery can be obtained by applying the slurry composition for a non-aqueous secondary battery electrode that is obtained as described above onto a current collector, and drying the slurry composition for a non-aqueous secondary battery electrode that has been applied onto the current collector. In other words, the presently disclosed electrode for a non-aqueous secondary battery includes an electrode mixed material layer formed using the slurry composition for a non-aqueous secondary battery electrode. Moreover, the presently disclosed electrode for a non-aqueous secondary battery is obtained through a slurry composition application step and a slurry composition drying step.

In other words, the presently disclosed electrode for a non-aqueous secondary battery is formed from a dried product of the slurry composition for a non-aqueous secondary battery electrode set forth above, and contains at least an electrode active material and the above-described water-soluble polymer.

Components contained in the electrode are components that were contained in the presently disclosed slurry composition for a non-aqueous secondary battery electrode, and the preferred ratio of these components is the same as the preferred ratio of these components in the presently disclosed slurry composition for a non-aqueous secondary battery electrode. As a result of the presently disclosed binder composition being used, the presently disclosed electrode for a non-aqueous secondary battery can cause a secondary battery to display good high-temperature cycle characteristics, can inhibit deposition of lithium dendrites and the like, and tends not to swell even upon repeated charging and discharging.

[Application Step]

The previously described slurry composition for a secondary battery electrode can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light or electron beams. Through drying of the slurry composition on the current collector as described above, an electrode mixed material layer is formed on the current collector, thereby providing an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector, and can reduce porosity of the electrode.

Another example of a method by which the presently disclosed electrode for a secondary battery can be produced is a powder molding method. The powder molding method is a production method in which the electrode for a secondary battery is obtained by preparing a slurry composition for producing the electrode for a secondary battery, producing composite particles containing an electrode active material and the like from this slurry composition, supplying these composite particles onto a current collector, and then performing roll pressing and molding as desired to form an electrode mixed material layer. The slurry composition that is used may be the same as the previously described slurry composition.

(Secondary Battery)

The presently disclosed secondary battery includes a positive electrode, a negative electrode, an electrolysis solution, and a separator, wherein the presently disclosed electrode for a secondary battery is used as at least one of the positive electrode and the negative electrode. As a result of the previously described electrode being used therein, the presently disclosed secondary battery has excellent high-temperature cycle characteristics, and tends not to experience deposition of lithium dendrites and the like at an electrode or electrode swelling.

The presently disclosed secondary battery may be a lithium ion secondary battery, a nickel-hydrogen secondary battery, or the like. Of these secondary batteries, a lithium ion secondary battery is preferable because the effect of performance enhancement in terms of high-temperature cycle characteristics and the like is particularly remarkable. The following describes a case in which the presently disclosed secondary battery is a lithium ion secondary battery.

<Electrodes>

As explained above, the presently disclosed electrode for a secondary battery is used as at least one of the positive electrode and the negative electrode. In other words, the positive electrode of the presently disclosed secondary battery may be the presently disclosed electrode for a secondary battery and the negative electrode of the presently disclosed secondary battery may be a known negative electrode other than the presently disclosed electrode. Alternatively, the negative electrode of the presently disclosed secondary battery may be the presently disclosed electrode for a secondary battery and the positive electrode of the presently disclosed secondary battery may be a known positive electrode other than the presently disclosed electrode. Further alternatively, the positive electrode and the negative electrode of the presently disclosed secondary battery may both be the presently disclosed electrode for a secondary battery.

<Electrolysis Solution>

The electrolysis solution of the lithium ion secondary battery may, for example, be a non-aqueous electrolysis solution obtained by dissolving a supporting electrolyte in a non-aqueous solvent. The supporting electrolyte is normally a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as these lithium salts readily dissolve in solvents and exhibit a high degree of dissociation. One of these lithium salts may be used individually, or two or more of these lithium salts may be used in combination in a freely selected ratio. Lithium ion conductivity tends to increase when a supporting electrolyte with a higher degree of dissociation is used. Therefore, lithium ion conductivity can be adjusted through the type of supporting electrolyte.

No specific limitations are placed on the non-aqueous solvent so long as the supporting electrolyte can dissolve therein. Examples of non-aqueous solvents that can be used include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Of these non-aqueous solvents, carbonates are preferable in terms of having high permittivity and a wide stable potential region. One non-aqueous solvent may be used individually, or two or more non-aqueous solvents may be used in combination in a freely selected ratio.

Furthermore, the electrolysis solution may contain additives. Examples of additives that can be used include carbonate compounds such as vinylene carbonate (VC) and fluoroethylene carbonate (FEC), and compounds for improving resistance to overcharging such as divinylbenzene. One additive may be used individually, or two or more additives may be used in combination in a freely selected ratio. Examples of electrolysis solutions that may be used, other than those described above, include a polymer electrolyte such as polyethylene oxide or polyacrylonitrile; a gel-form polymer electrolyte obtain by impregnating the aforementioned polymer electrolyte with an electrolysis solution; and an inorganic solid electrolyte such as LiI or $Li_3N$.

<Separator>

Examples of the separator include separators described in JP 2012-204303 A. Of these separators, a microporous membrane made of polyolefinic resin (polyethylene, polypropylene, polybutene, or polyvinyl chloride) is preferred because such a membrane can reduce the total thickness of the separator, which increases the ratio of electrode active material in the lithium ion secondary battery, and consequently increases the capacity per volume.

<Production Method of Secondary Battery>

In one specific example of a method for producing the presently disclosed secondary battery, the positive electrode and the negative electrode are stacked with the separator in-between, rolling, folding, or the like of the resultant laminate is performed in accordance with the battery shape to place the laminate in a battery container, the electrolysis solution is injected into the battery container, and the battery container is sealed. In order to prevent pressure increase inside the battery and occurrence of overcharging or over-discharging, an expanded metal; an overcurrent preventing device such as a fuse or a PTC device; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative examples to evaluate the degree of swelling in electrolysis solution of a produced water-soluble polymer, deposition of lithium dendrites at an electrode, electrode swelling, electrode peel strength, the high-temperature cycle characteristics and rate characteristics of a secondary battery, and the gel content and glass transition temperature of a particulate polymer.

<Degree of Swelling in Electrolysis Solution of Water-Soluble Polymer (Degree of Swelling in Electrolysis Solution)>

An aqueous solution containing a water-soluble polymer was dried in an environment having a humidity of 50% and a temperature of 23° C. to 25° C. to form a film of 1±0.3 mm in thickness. The resultant film was dried for 10 hours in a vacuum dryer at a temperature of 60° C., and then the dried film was cut and precisely weighed. The mass of a film piece obtained by this cutting was taken to be W0. The film piece was immersed in an electrolysis solution (composition: $LiPF_6$ solution of 1.0 M in concentration (mixed solvent of 3/7 (volume ratio) ethylene carbonate (EC)/ethyl methyl carbonate (EMC) used as solvent; 2 volume % (solvent ratio) of vinylene carbonate used as additive)) for 3 days at an ambient temperature of 60° C., and was allowed to swell. Thereafter, the film piece (swollen film piece) was pulled out of the electrolysis solution and the mass thereof was measured after electrolysis solution on the surface of the film piece had been wiped off using a KimWipe. The mass of the swollen film piece was taken to be W1.

The degree of swelling in electrolysis solution (factor) was calculated using the following calculation formula.

Degree of swelling in electrolysis solution (factor)= $W1/W0$

<Deposition of Lithium Dendrites (Li Deposition)>

A lithium ion secondary battery produced in each of the examples and comparative examples was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.35 V) and CC discharging of the lithium ion secondary battery was performed to a cell voltage of 3.00 V with a 0.2 C constant current. This charging and discharging at 0.2 C was repeated 3 times.

Next, constant-current charging and discharging of the lithium ion secondary battery at 1.0 C was repeated 10 times between cell voltages of 4.35 V and 3.00 V at an ambient temperature of 25° C. Thereafter, the cell was disassembled in a 1.0 C constant-current charged state to remove the negative electrode. The removed negative electrode was washed with diethyl carbonate. Deposits of lithium dendrites (hereinafter, also referred to as "Li deposits") on the surface of the negative electrode were visually inspected and were evaluated by the following standard. Note that the Li deposits appeared silvery-white in color. When the amount of Li deposits is small, the risk of a short-circuit occurring due to damage to a separator in the secondary battery caused by the Li deposits is reduced, and secondary battery safety is improved.

A: Li deposits not observed

B: Li deposits observed over less than 5% of entire electrode surface area

C: Li deposits observed over at least 5% and less than 15% of entire electrode surface area D: Li deposits observed over 15% or more of entire electrode surface area <Electrode Swelling>

A lithium ion secondary battery produced in each of the examples and comparatives that had been used in evaluation of rate characteristics as subsequently described was discharged to a cell voltage of 3.00 V by a 0.2 C constant-current at a temperature of 25° C. and was then CC-CV charged with a 0.2 C constant-current (upper limit cell voltage 4.35 V). The lithium ion secondary battery was then disassembled in order to take out the negative electrode. The thickness T1 of the negative electrode mixed material layer was measured using a thickness gauge. The rate of thickness change indicated by $\Delta T=\{(T1-T0)/T0\}\}\times 100(\%)$ was determined by taking the thickness of the negative electrode mixed material layer prior to production of the lithium ion secondary battery to be T0, and was evaluated by the following standard. A smaller rate of change of the thickness of the negative electrode, expressed by the rate of thickness change $\Delta T$, indicates a small degree of swelling of the negative electrode after cycling.

A: Rate of thickness change $\Delta T$ of less than 15%

B: Rate of thickness change $\Delta T$ of at least 15% and less than 20%

C: Rate of thickness change $\Delta T$ of at least 20% and less than 25%

D: Rate of thickness change $\Delta T$ of 25% or more

<Peel Strength>

A negative electrode for a lithium ion secondary battery produced in each of the examples and comparative examples was cut out as a rectangle of 100 mm in length by 10 mm in width to prepare a specimen. The specimen was placed with the surface corresponding to the negative electrode mixed material layer underneath and cellophane tape (tape prescribed by JIS Z1522) was affixed to the surface of the negative electrode mixed material layer. One end of the current collector was pulled in a vertical direction at a pulling speed of 100 mm/minute to peel off the current collector, and the stress in this peeling was measured (note that the cellophane tape was secured to a test bed). This measurement was performed 3 times to obtain an average value for the stress. The average value was taken to be the peel strength and was evaluated by the following standard. A larger value for the peel strength indicates better close adherence between the negative electrode mixed material layer and the current collector.

A: Peel strength of 3.0 N/m or more

B: Peel strength of at least 2.0 N/m and less than 3.0 N/m

C: Peel strength of less than 2.0 N/m

<High-Temperature Cycle Characteristics>

A lithium ion secondary battery produced in each of the examples and comparative examples was left for 5 hours at a temperature of 25° C. after being filled with an electrolysis solution. Next, the lithium ion secondary battery was charged to a cell voltage of 3.65V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.35 V) and CC discharging of the lithium ion secondary battery was performed to a cell voltage of 3.00 V by a 0.2 C constant-current method. This charging and discharging at 0.2 C was repeated three times.

Thereafter, the lithium ion secondary battery was subjected to 100 cycles of a charge/discharge operation at an ambient temperature of 45° C., a cell voltage of 4.35 V to 3.00 V, and a charge/discharge rate of 0.5 C. The discharge capacity of the $1^{st}$ cycle was defined as X1 and the discharge capacity of the $100^{th}$ cycle was defined as X2.

The capacity maintenance rate indicated by $\Delta C'=(X2/X1)\times 100(\%)$ was determined using the discharge capacity X1 and the discharge capacity X2, and was evaluated by the following standard. A larger value for the capacity maintenance rate $\Delta C'$ indicates better cycle characteristics.

A: Capacity maintenance rate $\Delta C'$ of 90% or more

B: Capacity maintenance rate $\Delta C'$ of at least 87% and less than 90%

C: Capacity maintenance rate $\Delta C'$ of at least 84% and less than 87%

D: Capacity maintenance rate $\Delta C'$ of less than 84%

<Secondary Battery Rate Characteristics>

A lithium ion secondary battery produced in each of the examples and comparative examples was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.35 V) and CC discharging of the lithium ion secondary battery was performed to a cell voltage of 3.00 V with a 0.2 C constant current. This charging and discharging at 0.2 C was repeated three times.

Next, 0.5 C constant-current charging and discharging of the lithium ion secondary battery was performed between cell voltages of 4.35 V and 3.00 V at an ambient temperature of 25° C. The discharge capacity at this time was defined as C0. Thereafter, the lithium ion secondary battery was CC-CV charged with a 0.2 C constant current in the same manner and was then discharged to 2.5 V with a 0.5 C constant current at an ambient temperature of −20° C. The discharge capacity at this time was defined at C1. The capacity maintenance rate indicated by $\Delta C=(C1/C0)\times 100 (\%)$ was determined as a rate characteristic, and was evaluated by the following standard. A larger value for the capacity maintenance rate $\Delta C$ indicates higher discharge capacity at high current and low ambient temperature, and lower internal resistance.

A: Capacity maintenance rate $\Delta C$ of 75% or more

B: Capacity maintenance rate $\Delta C$ of at least 70% and less than 75%

C: Capacity maintenance rate $\Delta C$ of at least 65% and less than 70%

D: Capacity maintenance rate $\Delta C$ of less than 65%

<Gel Content of Particulate Polymer>

A water dispersion containing a particulate polymer was dried in an environment having a humidity of 50% and a temperature of 23° C. to 25° C. to form a film of 1±0.3 mm in thickness. The resultant film was dried for 10 hours in a vacuum dryer at a temperature of 60° C. Thereafter, the dried film was cut to a square piece of from 3 mm to 5 mm in length and the mass of this piece, which was approximately 1 g, was precisely weighed. The mass of the film piece obtained by this cutting was taken to be w0. The film piece was immersed in 50 g of tetrahydrofuran (THF) for 24 hours. Thereafter, the film piece was pulled out of the THF, was vacuum dried for 3 hours at a temperature of 105° C., and the mass w1 of insoluble content was measured. The gel content was calculated according to the following calculation formula.

Gel content (mass %)=(w1/w0)×100

<Glass Transition Temperature of Particulate Polymer>

A water dispersion of each particulate polymer that was to be used as a measurement sample was prepared. The prepared water dispersion was used as a measurement sample. Note that in the case of a particulate polymer having a core-shell structure, a water dispersion containing a polymer was produced under the same polymerization conditions as in polymerization of the core portion and a water dispersion containing a polymer was produced under the same polymerization conditions as in polymerization of the shell portion, and these water dispersions were used as measurement samples. A differential scanning calorimeter (produced by SII NanoTechnology Inc.; product name: EXSTAR DSC6220) was used to measure the glass transition temperature for each measurement sample.

Specifically, 10 mg of the measurement sample was weighed into an aluminum pan and then a DSC curve was measured in a measurement temperature range of −100° C. to 500° C. with a heating rate of 10° C./minute, and under standard temperature and standard humidity as prescribed by JIS Z 8703. Note that an empty aluminum pan was used as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

Example 1

<Production of Water-Soluble Polymer>

A 3 L flask equipped with a septum was charged with 800 g of deionized water, 0.1 g of hydroxyethylacrylamide (0.1 parts by mass of hydroxyethylacrylamide monomer), 6.3 g of 80% acrylic acid aqueous solution (5.0 parts by mass of acrylic acid monomer), and 237.3 g of 40% acrylamide aqueous solution (94.9 parts by mass of acrylamide monomer). Bubbling with nitrogen gas was performed for 60 minutes at a flow rate of 100 mL/minute in order to remove dissolved oxygen, and the inside of the flask was then maintained at a positive pressure through ventilation with nitrogen gas at a flow rate of 50 mL/minute.

The flask was heated to 40° C. under stirring and 0.09 g of L-ascorbic acid was added thereto as a polymerization aid. Thereafter, 6.6 g of 2.0% potassium persulfate aqueous solution as an oxidizing agent was dripped into the flask using a syringe to initiate a polymerization reaction. After 3 hours had passed, 0.02 g of sodium hydrogen nitrite as a reducing agent and 19.7 g of 0.2% potassium persulfate aqueous solution as an oxidizing agent were added using a syringe and the flask was heated to a temperature of 80° C. in order to further increase the reaction conversion rate while continuing polymerization of residual monomer. One hour after reaching 80° C., 0.02 g of sodium hydrogen nitrite as a reducing agent and 19.7 g of 0.2% potassium persulfate aqueous solution as an oxidizing agent were further added using a syringe, and mixing was performed for a further 2 hours.

Thereafter, the flask was cooled to 40° C. and was converted to an air atmosphere. The system was then adjusted to a pH of 8.0 using 5% lithium hydroxide aqueous solution (80 mol % to 90 mol % of the acid group content of acid group-containing monomer units was converted to a lithium salt).

The resultant aqueous solution of a water-soluble polymer had a polymer solid content concentration of 9.2%. In measurement by high-performance liquid chromatography, the concentrations of residual hydroxyethylacrylamide and residual acrylic acid monomer were less than the detection limit (less than 1 ppm), and the concentration of residual acrylamide monomer was 50 ppm. The viscosity of a dilute solution of the water-soluble polymer having a solid content of 1% was 550 mPa·s as measured by a B-type viscometer at 25° C. and 60 rpm.

<Production of Particulate Polymer (SBR 1) Composed of Styrene-Butadiene Copolymer>

A pressure vessel equipped with a stirrer was charged with 65 parts of styrene, 35 parts of 1,3-butadiene, 2 parts of itaconic acid, 1 part of 2-hydroxyethyl acrylate, 0.3 parts of t-dodecyl mercaptan, 5 parts of sodium dodecylbenzenesulfonate, 150 parts of deionized water, and 1 part of potassium persulfate. The contents of the pressure vessel were sufficiently stirred and were then heated to a temperature of 55° C. to initiate polymerization.

Cooling was performed to terminate the reaction once monomer consumption had reached 95.0%. The water dispersion containing the resultant polymer was adjusted to a pH of 8 through addition of 5% sodium hydroxide aqueous solution. Thereafter, unreacted monomers were removed by distillation under heating and reduced pressure. Cooling was then performed to a temperature of 30° C. or lower to yield a water dispersion containing a particulate polymer SBR 1 composed of a styrene-butadiene copolymer. Note that the SBR 1 had a gel content of 92 mass % and a glass transition temperature (Tg) of 10° C.

<Production of Slurry Composition for Lithium Ion Secondary Battery Negative Electrode>

A planetary mixer was charged with 97.5 parts of artificial graphite (volume average particle diameter D50: 19 μm; BET specific surface area: 1.5 m²/g; theoretical capacity: 360 mAh/g) as a negative electrode active material 1 and 1.0 parts in terms of solid content of the water-soluble polymer-containing aqueous solution (solid content concentration: 9.2%) as a binder composition. The contents of the planetary mixer were diluted to a solid content concentration of 56% with deionized water. Thereafter, kneading was performed for 60 minutes at a rotation speed of 45 rpm to obtain a slurry in the form of a paste. Further deionized water was added to adjust the viscosity to 5,000±1,000 mPa·s (measured by a B-type viscometer at 25° C. and 60 rpm). Thereafter, 1.5 parts in terms of solid content of the particulate polymer SBR 1 (solid content concentration: 40.0%) was added and kneading was then performed for 30 minutes at a rotation speed of 40 rpm to produce a slurry composition for a lithium ion secondary battery negative electrode. The viscosity was subsequently adjusted to 3,500±500 mPa·s (measured by a B-type viscometer at 25° C. and 60 rpm) through addition of deionized water. At this point, the slurry composition had a solid content concentration of 45 mass %.

<Production of Negative Electrode for Lithium Ion Secondary Battery>

A comma coater was used to apply the slurry composition for a lithium ion secondary battery negative electrode onto the surface of copper foil (current collector) of 15 μm in thickness such that the applied amount of the slurry composition was 10.8 mg/cm² to 11.2 mg/cm². The copper foil onto which the slurry composition for a lithium ion secondary battery negative electrode had been applied was conveyed inside an 80° C. oven for 2 minutes and a 110° C. oven for 2 minutes at a speed of 300 mm/minute in order to dry the slurry composition on the copper foil and thereby obtain a negative electrode web.

The resultant negative electrode web was pressed using a roll press to achieve a density of 1.68 g/cm³ to 1.72 g/cm³. The pressed negative electrode web was then left for 4 hours under vacuum conditions at an ambient temperature of 105° C. in order to remove moisture and further promote cross-linking, and a negative electrode was obtained as a result. This negative electrode was used to evaluate close adherence of the negative electrode mixed material layer and the current collector (peel strength). The results are shown in Table 1.

<Production of Positive Electrode for Lithium Ion Secondary Battery>

A slurry composition for a lithium ion secondary battery positive electrode was produced by adding 100 parts of $LiCoO_2$ as a positive electrode active material, 2 parts of acetylene black (HS-100 produced by Denki Kagaku Kogyo Kabushiki Kaisha) as a conductive material, and 2 parts of PVDF (polyvinylidene fluoride; KF-1100 produced by Kureha Corporation) as a binder into a planetary mixer, adding N-methylpyrrolidone as a dispersion medium to adjust the total solid content concentration to 67%, and mixing these materials.

A comma coater was used to apply the resultant slurry composition for a lithium ion secondary battery positive electrode onto aluminum foil (current collector) of 20 μm in thickness so that the applied amount of the slurry composition was 18.9 mg/cm² to 20.1 mg/cm². Thereafter, the aluminum foil onto which the slurry composition for a lithium ion secondary battery positive electrode had been applied was conveyed inside a 60° C. oven for 2 minutes at a speed of 0.5 m/minute in order to dry the slurry composition. Thereafter, heat treatment was performed for 2 minutes at a temperature of 120° C. to obtain a positive electrode web.

The resultant positive electrode web was pressed using a roll press to achieve a density of 3.40 g/cm³ to 3.50 g/cm³. The pressed positive electrode web was then left for 3 hours under vacuum conditions at an ambient temperature of 120° C. in order to remove the dispersion medium, and a positive electrode was obtained as a result.

<Production of Lithium Ion Secondary Battery>

A single-layer polypropylene separator (width: 65 mm; length: 500 mm; thickness: 25 μm; produced by a dry method; porosity: 55%) was prepared and was cut out as a 5 cm×5 cm square. An aluminum packing case was prepared as a battery case.

The positive electrode produced as described above was cut out as a 3.8 cm×2.8 cm square and was placed with the surface at the current collector side of the positive electrode in contact with the aluminum packing case. Next, the square separator was placed on the surface at the positive electrode mixed material layer side of the positive electrode. The negative electrode produced as described above was cut out as a 4.0 cm×3.0 cm square and was placed on the separator such that the surface at the negative electrode mixed material layer side of the negative electrode faced the separator. Thereafter, the aluminum packing case was filled with an electrolysis solution that was a $LiPF_6$ solution of 1.0 M in concentration (mixed solvent of ethylene carbonate (EC)/ ethyl methyl carbonate (EMC)=3/7 (volume ratio) used as solvent; 2 volume % (solvent ratio) of vinylene carbonate contained as additive). The aluminum packing was then closed by heat sealing at a temperature of 150° C. to tightly seal an opening of the aluminum packing, and thereby produce a lithium ion secondary battery.

The obtained lithium ion secondary battery was used to evaluate deposition of lithium dendrites at an electrode, rate characteristics, and high-temperature cycle characteristics. Additionally, the secondary battery obtained after rate testing was used to evaluate electrode swelling. The results are shown in Table 1.

Examples 2 to 12

A water-soluble polymer, a binder composition, a slurry composition for a negative electrode, a negative electrode, a positive electrode, and a secondary battery were produced and each evaluation was performed in the same way as in Example 1 with the exception that the make-up and amount of the water-soluble polymer, and the amount of the negative electrode active material were changed as shown in Table 1. The results are shown in Table 1.

Example 13

A water-soluble polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, and a particulate polymer (SBR 2) that had a core-shell structure in which the shell portion was composed of a styrene-butadiene copolymer and that was produced by the method described below was used as a particulate polymer in addition to the particulate polymer (SBR 1). The results are shown in Table 2.

<Production of Core-Shell Structure Particulate Polymer (SBR 2) Having Shell Portion Composed of Styrene-Butadiene Copolymer>

A pressure vessel equipped with a stirrer was charged with 35 parts of acrylonitrile, 65 parts of 1,3-butadiene, 0.3 parts of t-dodecyl mercaptan, 5 parts of sodium dodecylbenzenesulfonate, 150 parts of deionized water, and 1 part of potassium persulfate. The contents of the pressure vessel were sufficiently stirred and were then heated to a temperature of 55° C. to initiate polymerization of a polymer forming a core portion.

At the point at which monomer consumption reached 80.0%, a water dispersion that has been prepared in advance by mixing 27 parts of styrene, 15 parts of 1,3-butadiene, 16 parts of acrylonitrile, 1 part of acrylic acid, 2 parts of itaconic acid, 0.3 parts of t-dodecyl mercaptan, 5 parts of sodium dodecylbenzenesulfonate, 150 parts of deionized water, and 1 part of potassium persulfate was further added, and polymerization of a polymer forming a shell portion was carried out. The reaction was terminated by cooling at the point at which consumption of all charged monomers reached 95.0%. The water dispersion containing the resultant polymer was adjusted to a pH of 8 through addition of 5% sodium hydroxide aqueous solution. Thereafter, unreacted monomers were removed by distillation under heating and reduced pressure. Cooling was subsequently performed to a temperature of 30° C. or lower to yield a water dispersion containing a core-shell structure particulate polymer SBR 2 having a shell portion composed of a styrene-butadiene-acrylonitrile copolymer. The SBR 2 had a gel content of 75 mass %. Moreover, the glass transition temperature (Tg) of the core portion was −37° C. and the glass transition temperature (Tg) of the shell portion was 35° C.

Example 14

A water-soluble polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, and a particulate polymer (ACR 1) obtained according to the following production method was used as a particulate polymer in addition to the particulate polymer (SBR 1). The results are shown in Table 2.

<Production of Particulate Polymer (ACR 1) Composed of Acrylic Polymer>

A 5 MPa pressure vessel equipped with a stirrer was charged with 82 parts of n-butyl acrylate; 2 parts of acrylonitrile as an α,β-unsaturated monomer, 2 parts of methacrylic acid, 1 part of N-methylolacrylamide, and 1 part of allyl glycidyl ether; 4 parts of sodium lauryl sulfate; 150 parts of deionized water; and 0.5 parts of ammonium persulfate. The contents of the pressure vessel were sufficiently stirred and were then heated to a temperature of 80° C. to initiate polymerization.

Cooling was performed to terminate the reaction once monomer consumption had reached 96.0%. A water dispersion containing the resultant acrylic polymer was adjusted to a pH of 7 through addition of 5% sodium hydroxide aqueous solution. Thereafter, unreacted monomers were removed by distillation under heating and reduced pressure. Cooling was then performed to a temperature of 30° C. or lower to yield a water dispersion containing a particulate polymer composed of the acrylic polymer. The acrylic polymer had a gel content of 90 mass % and a glass transition temperature (Tg) of −50° C.

Example 15

A water-soluble polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, and a particulate polymer (ACR 2) obtained according to the following production method was used as a particulate polymer in addition to the particulate polymer 1 (SBR 1). The results are shown in Table 2.

<Production of Core-Shell Structure Particulate Polymer (ACR 2) Having Core Portion Composed of Acrylic Polymer>

A pressure vessel equipped with a stirrer was charged with 30 parts of butyl acrylate, 25 parts of methacrylic acid, 30 parts of 2-ethylhexyl acrylate, 1 part of acrylamide, and 1 part of acrylic acid as a monomer composition used in core portion production; 1 part of sodium dodecylbenzenesulfonate as an emulsifier; 150 parts of deionized water; and 0.5 parts of potassium persulfate as a polymerization initiator. The contents of the pressure vessel were sufficiently stirred and were then heated to 60° C. to initiate polymerization. Polymerization was continued until a polymerization conversion rate of 96% was reached to yield a water dispersion containing a particulate polymer forming a core portion.

Next, 13 parts of styrene as a monomer composition used in shell portion production was continuously added to the water dispersion, the water dispersion was heated to 70° C., and polymerization was continued. The reaction was terminated by cooling at the point at which the polymerization conversion rate reached 96% to yield a water dispersion containing a particulate polymer ACR 2. The obtained ACR 2 had a gel content of 90 mass %. Moreover, the glass transition temperature (Tg) of the core portion was 11° C. and the glass transition temperature (Tg) of the shell portion was 100° C.

Example 16

A water-soluble polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, and a particulate polymer (ACR 2) produced in the same way as in Example 15 was used as the particulate polymer instead of the particulate polymer (SBR 1). The results are shown in Table 2.

Example 17

A binder composition, a slurry composition for a negative electrode, a negative electrode, a positive electrode, and a secondary battery were produced and each evaluation was performed in the same way as in Example 1 with the exception that the make-up and amount of the water-soluble polymer were changed to the proportions shown in Table 2, and 0.5 parts in terms of solid content of a sodium salt of carboxymethyl cellulose (Daicel 2200 produced by Daicel FineChem Ltd.) was further added as a viscosity modifier. The results are shown in Table 2.

Example 18

A binder composition, a slurry composition for a negative electrode, a negative electrode, a positive electrode, and a secondary battery were produced and each evaluation was performed in the same way as in Example 17 with the exception that the amounts of the water-soluble polymer and the viscosity modifier were changed as shown in Table 2. The results are shown in Table 2.

Example 19

A binder composition, a slurry composition for a negative electrode, a negative electrode, a positive electrode, and a secondary battery were produced and each evaluation was performed in the same way as in Example 18 with the exception that the amounts of the water-soluble polymer and the viscosity modifier were changed as shown in Table 2, and SBR 1 and ACR 2 (produced in the same way as in Example 15) were used as particulate polymers in the proportions shown in Table 2. The results are shown in Table 2.

Example 20

A particulate polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, the amount of artificial graphite (negative electrode active material 1) was changed to 90 parts, 7 parts of a silicon-based active material $SiO_x$ (volume average particle diameter D50: 4.9 μm) was added as a negative electrode active material 2, and the applied amount of the slurry composition on the surface of the copper foil in production of the negative electrode was changed to from 7.6 mg/cm² to 8.0 mg/cm². The results are shown in Table 2.

Example 21

A particulate polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, the amount of artificial graphite (negative electrode active material 1) was changed to 80 parts, 16 parts of a silicon-based active material $SiO_x$ (volume average particle diameter D50: 4.9 μm) was added as a negative electrode active material 2, and the applied amount of the slurry composition on the surface of the copper foil in production of the negative electrode was changed to from 5.5 mg/cm² to 5.9 mg/cm². The results are shown in Table 2.

Example 22

A particulate polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2, and 1.5 parts of ACR 2 (produced in the same way as in Example 17) was used instead of SBR 1 as the particulate polymer. The results are shown in Table 2.

Example 23

A binder composition, a slurry composition for a negative electrode, a negative electrode, a positive electrode, and a secondary battery were produced and each evaluation was performed in the same way as in Example 17 with the exception that the amounts of the water-soluble polymer and the viscosity modifier were changed as shown in Table 2. The results are shown in Table 2.

Comparative Examples 1 and 2

A particulate polymer, a binder composition, a slurry composition for a negative electrode, a negative electrode, a positive electrode, and a secondary battery were produced and each evaluation was performed in the same way as in Example 1 with the exception that the make-up of the water-soluble polymer was changed to the proportions shown in Table 2. The results are shown in Table 2.

Comparative Example 3

A particulate polymer, a binder composition, a slurry composition for a negative electrode, a negative electrode, a positive electrode, and a secondary battery were produced and each evaluation was performed in the same way as in Example 1 with the exception that a water-soluble polymer was not used, and 1.0 parts of a viscosity modifier was added. The results are shown in Table 2.

In the following table:
"N-HEAA" indicates N-hydroxyethylacrylamide;
"N-HMAA" indicates N-hydroxymethylacrylamide;
"AA" indicates acrylic acid;
"AAM" indicates acrylamide;
"DMAA" indicates dimethylacrylamide;
"SBR 1" indicates particulate polymer composed of styrene-butadiene copolymer;
"SBR 2" indicates core-shell structure particulate polymer having shell portion composed of styrene-butadiene copolymer;
"ACR 1" indicates particulate polymer composed of acrylic polymer;
"ACR 2" indicates core-shell structure particulate polymer having core portion composed of acrylic polymer; and
"CMC" indicates carboxymethyl cellulose.

TABLE 1

| | | | | Example 1 | Example 2 | Example 3 | Example 4 | Example 5 |
|---|---|---|---|---|---|---|---|---|
| Slurry composition | Water-soluble polymer | Monomer represented by general formula (1) | Type | N-HEAA | N-HEAA | N-HEAA | N-HEAA | N-HEAA |
| | | | Amount | 0.1 | 0.1 | 0.5 | 0.5 | 20 |
| | | Acid group-containing monomer | Type | AA | AA | AA | AA | AA |
| | | | Amount | 5 | 30 | 10 | 25 | 10 |
| | | (Meth)acrylamide monomer | Type | AAM | AAM | AAM | AAM | AAM |
| | | | Amount | 94.9 | 69.9 | 89.5 | 74.5 | 70 |
| | | Degree of swelling in electrolysis solution [factor] | | 1.10 | 1.10 | 1.10 | 1.10 | 1.10 |
| | | Viscosity [mPa · s] | | 550 | 500 | 510 | 520 | 640 |
| | | Amount [mass %] | | 1 | 1 | 1 | 1 | 1 |
| | Negative electrode active material 1 | Type | | Artificial graphite | Artificial graphite | Artificial graphite | Artificial graphite | Artificial graphite |
| | | Amount [mass %] | | 97.5 | 97.5 | 97.5 | 97.5 | 97.5 |
| | Negative electrode active material 2 | Type | | — | — | — | — | — |
| | | Amount [mass %] | | — | — | — | — | — |
| | Viscosity modifier | Type | | — | — | — | — | — |
| | | Amount [mass %] | | — | — | — | — | — |
| | Paiticulate polymer 1 | Type | | SBR 1 | SBR 1 | SBR 1 | SBR 1 | SBR 1 |
| | | Amount [mass %] | | 1.5 | 1.5 | 1.5 | 1.5 | 1.5 |
| | Paiticulate polymer 2 | Type | | — | — | — | — | — |
| | | Amount [mass %] | | — | — | — | — | — |

TABLE 1-continued

| Evaluation | | | | | | | | |
|---|---|---|---|---|---|---|---|---|
| | Li deposition | | | B | B | B | B | B |
| | Electrode swelling | | | B | B | B | B | B |
| | Secondary battery high-temperature cycle characteristics | | | B | B | B | B | B |
| | Electrode peel strength | | | C | B | A | A | A |
| | Secondary battery rate characteristics | | | C | B | A | A | A |

| | | | | Example 6 | Example 7 | Example 8 | Example 9 |
|---|---|---|---|---|---|---|---|
| Slurry composition | Water-soluble polymer | Monomer represented by general formula (1) | Type | N-HEAA | N-HEAA | N-HEAA | N-HEAA |
| | | | Amount | 20 | 5 | 5 | 1 |
| | | Acid group-containing monomer | Type | AA | AA | AA | AA |
| | | | Amount | 25 | 20 | 20 | 15 |
| | | (Meth)acrylamide monomer | Type | AAM | AAM | AAM | AAM |
| | | | Amount | 55 | 75 | 75 | 84 |
| | | Degree of swelling in electrolysis solution [factor] | | 1.10 | 1.10 | 1.10 | 1.10 |
| | | Viscosity [mPa · s] | | 630 | 530 | 520 | 550 |
| | | Amount [mass %] | | 1 | 1.5 | 0.8 | 1 |
| | Negative electrode active material 1 | Type | | Artificial graphite | Artificial graphite | Artificial graphite | Artificial graphite |
| | | Amount [mass %] | | 97.5 | 97.0 | 97.7 | 97.5 |
| | Negative electrode active material 2 | Type | | — | — | — | — |
| | | Amount [mass %] | | — | — | — | — |
| | Viscosity modifier | Type | | — | — | — | — |
| | | Amount [mass %] | | — | — | — | — |
| | Particulate polymer 1 | Type | | SBR 1 | SBR 1 | SBR 1 | SBR 1 |
| | | Amount [mass %] | | 1.5 | 1.5 | 1.5 | 1.5 |
| | Particulate polymer 2 | Type | | — | — | — | — |
| | | Amount [mass %] | | — | — | — | — |
| Evaluation | Li deposition | | | B | A | A | A |
| | Electrode swelling | | | B | A | A | A |
| | Secondary battery high-temperature cycle characteristics | | | B | A | A | A |
| | Electrode peel strength | | | A | A | A | A |
| | Secondary battery rate characteristics | | | A | A | A | A |

| | | | | Example 10 | Example 11 | Example 12 |
|---|---|---|---|---|---|---|
| Slurry composition | Water-soluble polymer | Monomer represented by general formula (1) | Type | N-HEAA | N-HEAA | N-HEAA |
| | | | Amount | 1 | 15 | 15 |
| | | Acid group-containing monomer | Type | AA | AA | AA |
| | | | Amount | 20 | 15 | 20 |
| | | (Meth)acrylamide monomer | Type | AAM | AAM | AAM |
| | | | Amount | 79 | 70 | 65 |
| | | Degree of swelling in electrolysis solution [factor] | | 1.10 | 1.10 | 1.10 |
| | | Viscosity [mPa · s] | | 560 | 610 | 610 |
| | | Amount [mass %] | | 1 | 1 | 1 |
| | Negative electrode active material 1 | Type | | Artificial graphite | Artificial graphite | Artificial graphite |
| | | Amount [mass %] | | 97.5 | 97.5 | 97.5 |
| | Negative electrode active material 2 | Type | | — | — | — |
| | | Amount [mass %] | | — | — | — |
| | Viscosity modifier | Type | | — | — | — |
| | | Amount [mass %] | | — | — | — |
| | Particulate polymer 1 | Type | | SBR 1 | SBR 1 | SBR 1 |
| | | Amount [mass %] | | 1.5 | 1.5 | 1.5 |
| | Particulate polymer 2 | Type | | — | — | — |
| | | Amount [mass %] | | — | — | — |
| Evaluation | Li deposition | | | A | A | A |
| | Electrode swelling | | | A | A | A |
| | Secondary battery high-temperature cycle characteristics | | | A | A | A |
| | Electrode peel strength | | | A | A | A |
| | Secondary battery rate characteristics | | | A | A | A |

TABLE 2

| | | | | Example 13 | Example 14 | Example 15 | Example 16 | Example 17 |
|---|---|---|---|---|---|---|---|---|
| Slurry composition | Water-soluble polymer | Monomer represented by general formula (1) | Type | N-HEAA | N-HEAA | N-HEAA | N-HEAA | N-HEAA |
| | | | Amount | 5 | 5 | 5 | 5 | 5 |
| | | Acid group-containing monomer | Type | AA | AA | AA | AA | AA |
| | | | Amount | 20 | 20 | 20 | 20 | 20 |
| | | (Meth)acrylamide monomer | Type | AAM | AAM | AAM | AAM | AAM |
| | | | Amount | 75 | 75 | 75 | 75 | 75 |
| | | Degree of swelling in electrolysis solution [factor] | | 1.10 | 1.10 | 1.10 | 1.10 | 1.10 |
| | | Viscosity [mPa · s] | | 530 | 530 | 530 | 530 | 530 |
| | | Amount [mass %] | | 1 | 1 | 1 | 1 | 0.5 |
| | Negative electrode active material 1 | Type | | Artificial graphite | Artificial graphite | Artificial graphite | Artificial graphite | Artificial graphite |
| | | Amount [mass %] | | 97.5 | 97.5 | 97.5 | 97.5 | 97.5 |
| | Negative electrode active material 2 | Type | | — | — | — | — | — |
| | | Amount [mass %] | | — | — | — | — | — |
| | Viscosity modifier | Type | | — | — | — | — | CMC |
| | | Amount [mass %] | | — | — | — | — | 0.5 |
| | Particulate polymer 1 | Type | | SBR 1 | SBR 1 | SBR 1 | — | SBR 1 |
| | | Amount [mass %] | | 0.75 | 1.2 | 1.2 | — | 1.5 |
| | Particulate polymer 2 | Type | | SBR 2 | ACR 1 | ACR 2 | ACR 2 | — |
| | | Amount [mass %] | | 0.75 | 0.3 | 0.3 | 1.5 | — |
| Evaluation | Li deposition | | | A | A | A | A | A |
| | Electrode swelling | | | A | A | A | A | A |
| | Secondary battery high-temperature cycle characteristics | | | A | A | A | A | A |
| | Electrode peel strength | | | A | A | A | A | A |
| | Secondary battery rate characteristics | | | A | A | A | A | A |

| | | | | Example 18 | Example 19 | Example 20 | Example 21 | Example 22 |
|---|---|---|---|---|---|---|---|---|
| Slurry composition | Water-soluble polymer | Monomer represented by general formula (1) | Type | N-HEAA | N-HEAA | N-HEAA | N-HEAA | N-HEAA |
| | | | Amount | 5 | 5 | 5 | 5 | 5 |
| | | Acid group-containing monomer | Type | AA | AA | AA | AA | AA |
| | | | Amount | 20 | 20 | 20 | 20 | 20 |
| | | (Meth)acrylamide monomer | Type | AAM | AAM | AAM | AAM | AAM/DMAA |
| | | | Amount | 75 | 75 | 75 | 75 | 70/5 |
| | | Degree of swelling in electrolysis solution [factor] | | 1.10 | 1.10 | 1.10 | 1.10 | 1.40 |
| | | Viscosity [mPa · s] | | 530 | 530 | 530 | 530 | 420 |
| | | Amount [mass %] | | 0.3 | 0.1 | 3 | 3 | 1 |
| | Negative electrode active material 1 | Type | | Artificial graphite | Artificial graphite | Artificial graphite | Artificial graphite | Artificial graphite |
| | | Amount [mass %] | | 97.5 | 97.5 | 90 | 80 | 97.5 |
| | Negative electrode active material 2 | Type | | — | — | $SiO_x$ | $SiO_x$ | — |
| | | Amount [mass %] | | — | — | 7 | 16 | — |
| | Viscosity modifier | Type | | CMC | CMC | — | — | — |
| | | Amount [mass %] | | 0.7 | 0.9 | — | — | — |
| | Particulate polymer 1 | Type | | SBR 1 | SBR 1 | — | SBR 1 | — |
| | | Amount [mass %] | | 1.5 | 1.2 | — | 0.5 | — |
| | Particulate polymer 2 | Type | | — | ACR 2 | — | ACR 2 | ACR 2 |
| | | Amount [mass %] | | — | 0.3 | — | 0.5 | 1.5 |
| Evaluation | Li deposition | | | A | A | A | A | A |
| | Electrode swelling | | | A | A | A | A | B |
| | Secondary battery high-temperature cycle characteristics | | | A | A | A | A | B |
| | Electrode peel strength | | | A | A | A | A | A |
| | Secondary battery rate characteristics | | | A | A | A | A | A |

| | | | | Example 23 | Comparative Example 1 | Comparative Example 2 | Comparative Example 3 |
|---|---|---|---|---|---|---|---|
| Slurry composition | Water-soluble polymer | Monomer represented by general formula (1) | Type | N-HMAA | N-HEAA | N-HEAA | — |
| | | | Amount | 5 | 0 | 35 | |
| | | Acid group-containing monomer | Type | AA | AA | AA | |
| | | | Amount | 20 | 25.0 | 0 | |
| | | (Meth)acrylamide monomer | Type | AAM | AAM | AAM | |
| | | | Amount | 75 | 75 | 65 | |
| | | Degree of swelling in electrolysis solution [factor] | | 1.10 | 1.10 | 1.40 | |
| | | Viscosity [mPa · s] | | 450 | 560 | 600 | |
| | | Amount [mass %] | | 0.5 | 1 | 1 | |

TABLE 2-continued

| | | | | | | |
|---|---|---|---|---|---|---|
| | Negative electrode active material 1 | Type | Artificial graphite | Artificial graphite | Artificial graphite | Artificial graphite |
| | | Amount [mass %] | 97.5 | 97.5 | 97.5 | 97.5 |
| | Negative electrode active material 2 | Type | — | — | — | — |
| | | Amount [mass %] | — | — | — | — |
| | Viscosity modifier | Type | CMC | — | — | CMC |
| | | Amount [mass %] | 0.5 | — | — | 1.0 |
| | Particulate polymer 1 | Type | SBR 1 | SBR 1 | SBR 1 | SBR 1 |
| | | Amount [mass %] | 1.5 | 1.5 | 1.5 | 1.5 |
| | Particulate polymer 2 | Type | — | — | — | — |
| | | Amount [mass %] | — | — | — | — |
| Evaluation | Li deposition | | A | C | D | D |
| | Electrode swelling | | B | C | D | D |
| | Secondary battery high-temperature cycle characteristics | | A | C | D | D |
| | Electrode peel strength | | B | C | C | B |
| | Secondary battery rate characteristics | | A | C | D | D |

It can be seen from Tables 1 and 2 that the binder compositions according to Examples 1 to 23, which each contain a water-soluble polymer including a monomer unit derived from a monomer represented by general formula (1): $CH_2=C(R^1)-C=O-NH-R^2-OH$ ($R^1$ is hydrogen or an alkyl group and $R^2$ is $(CHR^3)_n(O(CHR^3)_m)_l$ [n=1 to 10; m=1 to 4; l=0 to 3; and $R^3$ is hydrogen or an alkyl group having a carbon number of 1 to 4]) in a proportion of at least 0.1 mass % and not more than 20 mass %, can cause a secondary battery to display good high-temperature cycle characteristics, are capable of forming an electrode mixed material layer that can inhibit deposition of lithium dendrites and the like at a negative electrode of a lithium ion secondary battery, and are capable of favorably inhibiting electrode swelling associated with repeated charging and discharging. On the other hand, the binder compositions according to Comparative Examples 1 and 2, which each contain a water-soluble polymer in which the percentage content of a monomer unit derived from a monomer represented by general formula (1) is outside the range set forth above, and the binder composition according to Comparative Example 3, in which a water-soluble polymer does not include a monomer unit derived from a monomer represented by general formula (1), are not able to sufficiently improve secondary battery high-temperature cycle characteristics, are not able to sufficiently inhibit electrode swelling associated with repeated charging and discharging, and may not be able to sufficiently inhibit deposition of lithium dendrites and the like.

INDUSTRIAL APPLICABILITY

According to this disclosure, it is possible to provide a binder composition for a non-aqueous secondary battery electrode and a slurry composition for a non-aqueous secondary battery electrode that can cause a secondary battery to display good high-temperature cycle characteristics, are capable of forming an electrode mixed material layer that can inhibit deposition of lithium dendrites and the like when used, for example, in formation of a negative electrode of a lithium ion secondary battery, and can favorably inhibit electrode swelling associated with repeated charging and discharging.

Moreover, according to this disclosure, it is possible to provide an electrode for a non-aqueous secondary battery that causes a secondary battery to display good high-temperature cycle characteristics, can inhibit deposition of lithium dendrites and the like, and does not readily swell even upon repeated charging and discharging.

Furthermore, according to this disclosure, it is possible to provide a non-aqueous secondary battery that has excellent high-temperature cycle characteristics and tends not to experience deposition of lithium dendrites and the like at an electrode or electrode swelling.

The invention claimed is:

1. A binder composition for a non-aqueous secondary battery electrode comprising:
   a water-soluble polymer,
   the water-soluble polymer including a monomer unit derived from an N-hydroxyalkyl(meth)acrylamide monomer in a proportion of at least 5 mass % and not more than 20 mass % and a (meth)acrylamide monomer unit in a proportion of at least 74.5 mass % and not more than 94.9 mass %; and
   a particulate polymer, the particular polymer including at least one of a styrene-butadiene copolymer and an acrylic polymer.

2. The binder composition for a non-aqueous secondary battery electrode according to claim 1, wherein
   the water-soluble polymer further includes an acid-group containing monomer unit in a proportion of at least 5 mass % and not more than 30 mass %.

3. The binder composition for a non-aqueous secondary battery electrode according to claim 2, wherein
   the acid group-containing monomer unit of the water-soluble polymer is at least partially in the form of a monovalent metal salt of an acid group-containing monomer unit.

4. The binder composition for a non-aqueous secondary battery electrode according to claim 1, wherein
   the water-soluble polymer has a degree of swelling in electrolysis solution of a factor of 1.50 or less.

5. A slurry composition for a non-aqueous secondary battery electrode comprising:
   an electrode active material;
   water; and
   the binder composition for a non-aqueous secondary battery electrode according to claim 1.

6. An electrode for a non-aqueous secondary battery comprising an electrode mixed material layer formed using the slurry composition for a non-aqueous secondary battery electrode according to claim 5.

7. A non-aqueous secondary battery comprising the electrode for a non-aqueous secondary battery according to claim 6.

8. The slurry composition for a non-aqueous secondary battery electrode according to claim 5, wherein when total solid content in the slurry composition is taken to be 100 mass %, an amount of the particulate polymer is 0.1 mass % or more and 5 mass % or less.

* * * * *